United States Patent
Liu et al.

(10) Patent No.: US 7,313,163 B2
(45) Date of Patent: Dec. 25, 2007

(54) FAST SYNCHRONIZATION FOR HALF DUPLEX DIGITAL COMMUNICATIONS

(75) Inventors: Bin Liu, Weston, FL (US); Charbel Khawand, Miami, FL (US); Jianping W. Miller, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 473 days.

(21) Appl. No.: 10/462,853

(22) Filed: Jun. 17, 2003

(65) Prior Publication Data
US 2004/0258136 A1 Dec. 23, 2004

(51) Int. Cl.
H04B 1/713 (2006.01)
H04L 7/00 (2006.01)

(52) U.S. Cl. ...................... 375/132; 375/357
(58) Field of Classification Search ............ 375/132, 375/354, 357
See application file for complete search history.

(56) References Cited

U.S. PATENT DOCUMENTS 6,321,095 B1 * 11/2001 Gavette ................... 455/517
6,366,572 B1 * 4/2002 Esterberg et al. ........... 370/343
6,625,209 B1 * 9/2003 Najafi ....................... 375/222
6,639,905 B1 * 10/2003 Muller et al. ............... 370/336

* cited by examiner

Primary Examiner—Kevin Kim

(57) ABSTRACT

Half duplex, Frequency Hopped-Spread Spectrum wireless transceivers (102), operating without a central controller, maintain time synchronization with the frequency hopping sequence for a period after transmission of a half duplex signal ceases. The wireless transceiver (102) operates their receivers (308) according to the RF frequency hopping sequence and schedule (200). The wireless transceiver (102) is then able to send a short transmission request to signal that it will start transmitting on the Frequency Hopping schedule (200) of the previously ceased transmission. A wireless transceiver (102) that was either the original transmitter or the original receiver is able to transmit this transmission request. A subset of time slots within the hopping schedule (200) can be optionally assigned to the original transmitter and original receiver to obviate collisions of the transmit request transmissions from both device at the same time.

17 Claims, 4 Drawing Sheets

FAST SYNCHRONIZATION FOR HALF DUPLEX DIGITAL COMMUNICATIONS

FIELD OF THE INVENTION

The present invention generally relates to the field of wireless communications and more particularly to transmission synchronization between and/or among wireless transceivers.

BACKGROUND OF THE INVENTION

Minimizing the design complexity of wireless transceivers, such as portable telephones and "walkie-talkies," reduces costs and often decreases weight and power consumption. Reducing cost, weight and power consumption of these devices is advantageous for all types of devices, particularly for portable communications equipment. Wireless transceivers sometimes use a half duplex mode of communications where only one wireless transceiver transmits at a time. When the one wireless transceiver transmits, one or more other wireless transceivers receive this signal.

Many wireless transceivers utilize communications protocols that incorporate a pre-defined time frame. In order for these devices to communicate, two or more devices communicating with such a protocol have to synchronize in order to properly communicate. Systems that use protocols with pre-defined time frames include spread spectrum radio systems that require a transmitter and one or more receivers to synchronize with each other prior to communicating data. Communications systems that have a central controller, such as a base radio station that transmits a standard signal that is available to other radios, establish synchronization with other radios through the use of this standard signal. This standard signal, however, requires an allocation of transmission bandwidth and limits the flexibility of communications between and/or among remote radio equipment. Wireless transceivers that operate in systems that do not have a central controller are required to synchronize with each other at the start of each transmission. This synchronization processing is often consumes time and power and is therefore ill-suited to half-duplex communications system where the transmitting wireless transceiver frequently alternates among the wireless transceivers used for point-to-point communications.

Therefore a need exists to overcome the problems with the prior art as discussed above.

SUMMARY OF THE INVENTION

According to an exemplary embodiment of the present invention, a wireless transceiver has a transmitter circuit for establishing a first frequency hopped communications link with a remote transceiver. The first frequency hopped communications link is synchronized to a time frame. The wireless transceiver also has a controller that maintains time synchronization to the time frame after transmission of the first frequency hopped communications link ceases and establishes a second frequency hopped communications link between the wireless transceiver and the remote transceiver. One of the wireless transceiver and the remote transceiver transmits over the second frequency hopped communications link and the second frequency hopped communications link is also synchronized to the time frame.

According to another aspect of the exemplary embodiments, a method for communicating with a transceiver includes establishing a first frequency hopped communications link between a wireless transceiver and a remote transceiver. The first frequency hopped communications link is synchronized to a time frame. The method also includes maintaining time synchronization to the time frame after transmission of the first frequency hopped communications link ceases. The method also includes establishing a second frequency hopped communications link between the wireless transceiver and the remote transceiver. The second frequency hopped communications link is also synchronized to the time frame.

DETAILED DESCRIPTION

The present invention, according to a preferred embodiment, overcomes problems with the prior art by providing a half duplex wireless transceiver, such as a voice and data capable wireless telephone, that maintains RF link synchronization after a transmission by one of the transceivers and while no transceiver is transmitting. This operation allows a wireless transceiver to begin transmitting with a transmission link request conveyed in a regular data packet that is directly transmitted using the time frame of the previously terminated FH-SS transmission. The wireless transceivers of the exemplary embodiment retain transmission frequency time frame synchronization for a period after the last transmission in order to facilitate direct, and therefore relatively rapid, transmission of a transmission link request packet.

Figure 1:
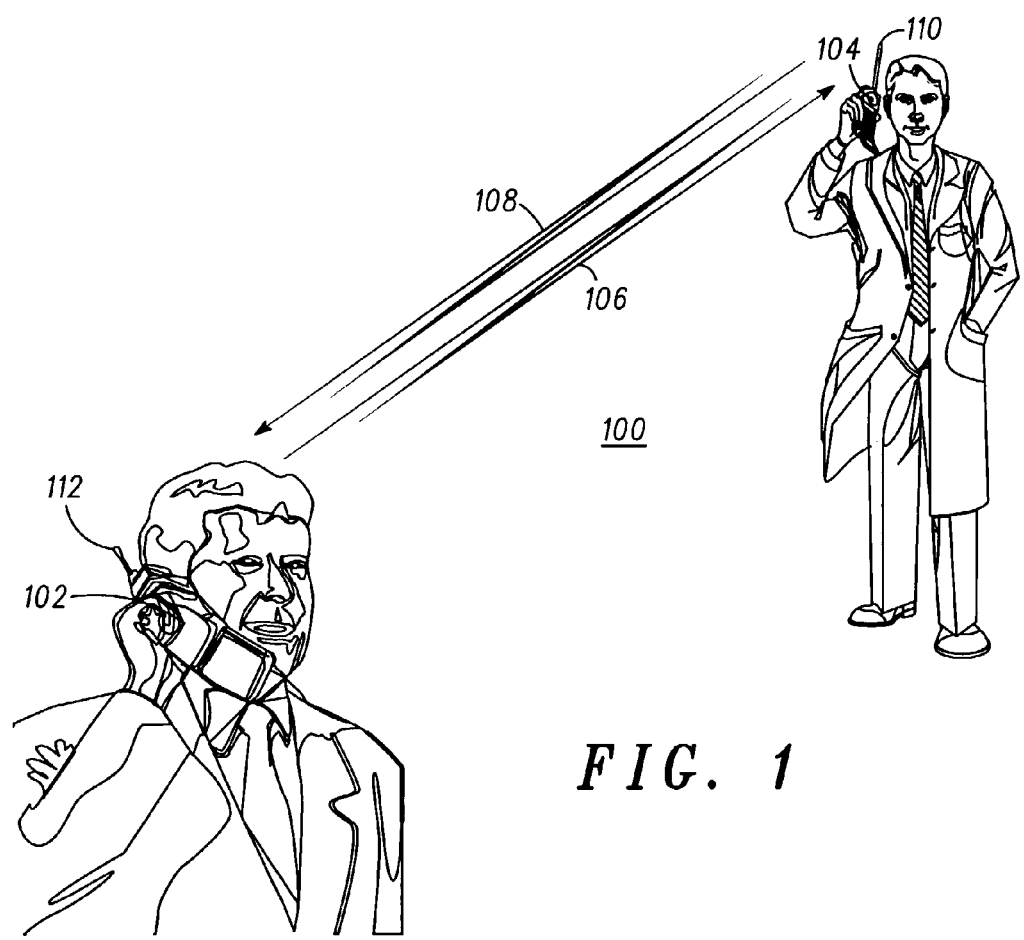
FIG. 1 is a physical configuration of users of two wireless transceivers used by an exemplary embodiment of the present invention.

A physical configuration 100 of users of two wireless transceivers used by an exemplary embodiment of the present invention is illustrated in FIG. 1. The physical configuration 100 includes two users who each have a wireless transceiver, wireless transceiver A 102 and wireless transceiver B 104. The two users use these wireless transceivers to communicate with each other, or with other users (not shown). Although two users are shown in this example to improve clarity of explanation, these embodiments operate in is to be understood that the features of these embodiments also operate in environments with multiple users. The wireless transceivers of this exemplary embodiment utilize half duplex communications so that only one wireless communication device, such as wireless transceiver A 102 or wireless transceiver B 104, transmits at a given time. When one wireless transceiver transmits, the other receives or searches for a transmission from another wireless transceiver. In the exemplary embodiment, a user begins transmitting a signal from a wireless transceiver by pressing a "Push-To-Talk" (PTT) button, similar to the PTT button used on conventional walkie-talkie devices.

When a user of a wireless transceiver wishes to talk to another user, the user of the wireless transceiver, such as the user of wireless transceiver A 102, presses the PTT button on the device. Upon pressing the PTT button on wireless transceiver A 102, wireless transceiver A 102 begins transmitting a first communications link 106, which is received by wireless transceiver B 104. When the user of wireless transceiver A 102 stops talking, the user releases the PTT button, thereby ceasing the first communications link 106 and allowing the user of wireless transceiver B 104 to transmit and talk. In order to transmit and talk, the user of wireless transceiver B 104 presses the PTT button 314 of wireless transceiver B 104 to start a second communications link 108. In the description of the exemplary embodiments, a wireless receiver being considered or discussed is referred to as communicating with a remote transceiver. A remote transceiver in this contest is a wireless transceiver with which the wireless receiver under consideration is communicating.

Embodiments of the present invention utilize a Frequency Hopped Spread Spectrum (FH-SS) signal. FH-SS signals are transmitted at a pre-defined sequence of RF frequency with only short bursts of RF energy that are transmitted at a specified RF frequency for a specified time period. The FH-SS signal is then transmitted on another frequency for another relatively short period of time. Receivers used to receive FH-SS signals are configured to track the frequency hopping sequence of the FH-SS signal so that the signal is properly received. The sequence of RF frequencies used for transmission and the time of transmission on each frequency is generally set for a particular system. The duration of transmissions at each frequency is typically constant and the sequence of RF transmission frequencies is generally one of several pseudo-random sequences that are defined within all devices used to communicate with that system. Different RF transmission frequency sequences, which may or may not overlap, are sometimes used by FH-SS systems to allow multiple "channels" to be simultaneously used by wireless transceivers that belong to the same system.

Figure 2:
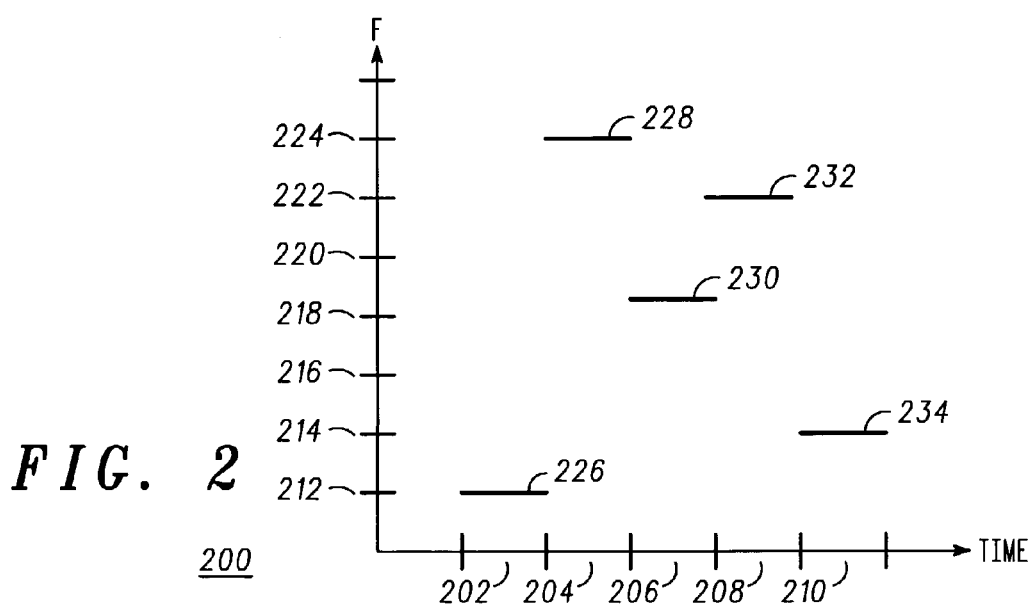
FIG. 2 is a portion of an RF frequency hopping sequence for an exemplary FH-SS signal as is used by an embodiment of the present invention.

A portion of an RF frequency hopping sequence 200 for an exemplary FH-SS signal as is used by an embodiment of the present invention is illustrated in FIG. 2. The portion of the frequency hopping sequence shows a sequence of five transmission frequencies. The horizontal scale shows progressing time and the vertical scale indicates relative RF frequency for this exemplary FH-SS signal. A first transmission segment 226 is shown to be transmitted during time duration A 202 at frequency A 212. After transmission of the first transmission segment 226 at frequency A 212, a second transmission 228 is shown during time duration B 204 at frequency G 224. After transmission of the second transmission segment 228 at frequency G 224, a third transmission 230 is shown during time duration C 206 at frequency D 218. After transmission of the third transmission segment 230 at frequency D 218, a fourth transmission 232 is shown during time duration D 208 at frequency F 222. After transmission of the fourth transmission segment 232 at frequency F 222, a fifth transmission 234 is shown during time duration E 210 at frequency B 214. The RF transmission frequency sequence then continues in a like manner. FH-SS systems typically use a RF transmission frequency sequence with a finite length and that repeats after the sequence is completed.

The RF frequency sequence versus time, such as is illustrated in the exemplary frequency hopping sequence 200, defines a time frame for the transmit frequency of the FH-SS system in which the wireless transceiver 102 is used.

The exemplary embodiments transmit several data bits within each transmission segment. Each time segment is referred to as a slot and each slot in the exemplary embodiment conveys multiple data bits. Voice communications between wireless transceivers of the exemplary embodiment is performed by digitizing the voice signal for transmission and transmitting the digital data. The use of a single transmission slot to transmit multiple data bytes facilitates transmission of a transmission request data packet, as is described below.

FH-SS systems use various techniques to synchronize one or more receivers with the FH-SS transmitter. When receivers are not expected to be synchronized to a transmitter in the exemplary embodiment of the present invention, the transmitter of the wireless transmission device transmits a synchronization sequence at the beginning of its transmission. As an example, the exemplary embodiments transmit a three RF frequency transmission sequence as an initial synchronization sequence, i.e., the synchronization sequence transmitted when the receiver is not expected to be synchronized to the FH-SS time frame. Receivers in this system monitor these three frequencies to detect the start of a transmission, as is performed by conventional FH-SS systems. Once the receivers of the exemplary embodiment detect energy at one of the three synchronization frequencies, the receiver then begins conventional reception by tuning to the frequencies specified by the FH-SS RF frequency sequence that is defined for that system and channel. If the receiver does not continue to receive the synchronization sequence at the subsequent frequencies, the receiver returns to searching for a synchronization signal. If the receiver does receive a complete synchronization sequence, which extends over several time slots in the exemplary embodiment, the wireless transceiver transmits an acknowledgement signal to the transmitting wireless transceiver and transmitting wireless transceiver begins transmitting user traffic data. This initial synchronization sequence is relatively long and is not well suited to applications, such as half duplex communications, where there are relatively short time spans with no RF transmission by any wireless transceiver and where different wireless transceivers begin transmission on a fairly frequent basis.

In addition to initial synchronization using the initial synchronization sequence described above, the processing of the exemplary embodiments of the present invention maintain time synchronization to the FH-SS time frame for a period after transmission of the FH-SS signal has ceased. This technique allows for relatively rapid and efficient starting of a transmission over an FH-SS link by either the wireless transceiver that was the transmitter in the previous transmission as well as by a wireless transceiver that was the receiver in the recently ceased transmission.

The exemplary embodiment of the present invention transmits multiple digital signals during each frequency hop time slot. The exemplary embodiments utilize a Frequency Shift Keying (FSK) modulation scheme that uses conventional techniques to sometimes transmit multiple bits on each transmitted symbol. The exemplary embodiment uses different numbers of transmitted bits per symbol depending upon the current phase of transmission. For example, a system identification preamble is transmitted using one bit per symbol. A symbol synchronization signal, a caller ID packet and message acknowledgement transmissions are transmitted with two bits per symbol. User data, such as digitized voice data, is transmitted with three bits per symbol.

Figure 3:
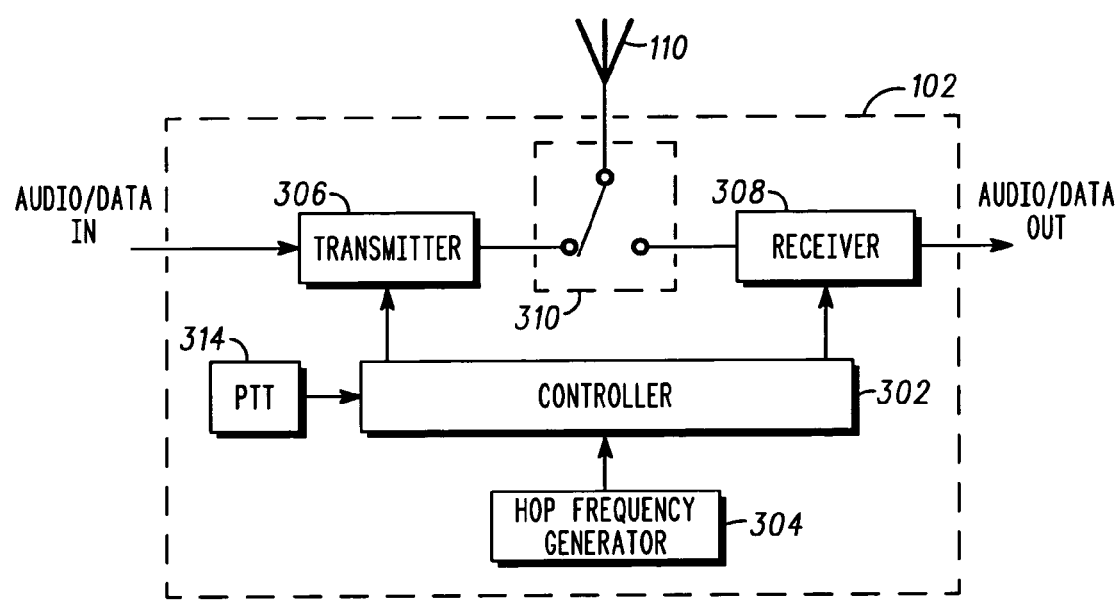
FIG. 3 is a block diagram of the electronic circuitry of a wireless transceiver as is used by an exemplary embodiment of the present invention.

An electrical block diagram 300 of a wireless transceiver 102 as is used by an exemplary embodiment of the present invention is illustrated in FIG. 3. The wireless communications device 102 includes a transmitter circuit 306 and a receiver circuit 308. The wireless transceiver 102 of the exemplary embodiment utilizes half-duplex communications wherein the wireless transceiver 102 is only able to either transmit or receive at a given time and not do both. The wireless transceiver 102 of the exemplary embodiment has an antenna 110 that is used by both the transmit circuit 306 and the receive circuit 308. The wireless transceiver 102 includes a transmit/receive switch 310 to switch the antenna 110 between the transmit circuit 306 and the receive circuit 308. Embodiments of the present invention may include transmit circuit 306 and receive circuit 308 that share components in order to reduce cost, size and power consumption. An advantage of devices that utilize half duplex communications is the ability to share components between transmit and receive functions which results in reduction in size, weight and cost.

The transmit circuit 306 accepts audio and/or data input that allows input of voice and/or data that is to be modulated onto the transmitted RF for transmission out of the wireless transceiver. The receive circuit 308 similarly has an audio and/or data output to provide the received audio and/or data to the user or other device that is connected to the wireless transceiver. Voice communications in the exemplary embodiment are performed by digitizing voice signals and transmitting the digital data that represents those voice signals.

The wireless transceiver 102 of the exemplary embodiment includes a controller 302. The controller 302 of the exemplary embodiment is a programmable processor that performs control functions associated with the processing of the present invention as well as other control, data processing and signal processing that is required by the wireless transceiver 102. The transmit circuit 306, receive circuit 308 and the transmit/receive switch 310 are controlled by the controller 302 in the exemplary embodiment. The wireless transceiver 102 also includes a hop frequency generator 304 that generates the sequence of RF frequency values that are used by the FH-SS system in which the wireless transceiver 102 is used. The exemplary embodiment uses Programmable Read Only Memory (PROM), such a FLASH memory devices, to store the sequence of RF frequency values used by the FH-SS system. This PROM is then read by the controller 302 of the exemplary embodiment to determine the RF frequency values to command to the transmit circuit 306 or the receive circuit 308. The wireless transceiver 102 also includes an internal clock 312 that is used, for example, to maintain synchronization with a FH-SS sequence time frame in the absence of a received or transmitted FH-SS signal.

The wireless transceiver 102 of the exemplary embodiment includes a Push-To-Talk (PTT) switch 314. The PTT switch 314 in the exemplary embodiment is pressed by a user of the wireless transceiver 102 in order to begin transmission to other receivers. The PTT switch 314 of the exemplary embodiment provides an input to the controller 302, which configures the transmit circuits 306, the transmit/receive switch 310 and the receive circuits 308 to either receive or transmit depending upon the position of the PTT switch. Functionality of the PTT switch is included in other embodiments that communicate data via the transmission circuit 306. These other embodiments provide a similar input to controller 302.

Figure 4:
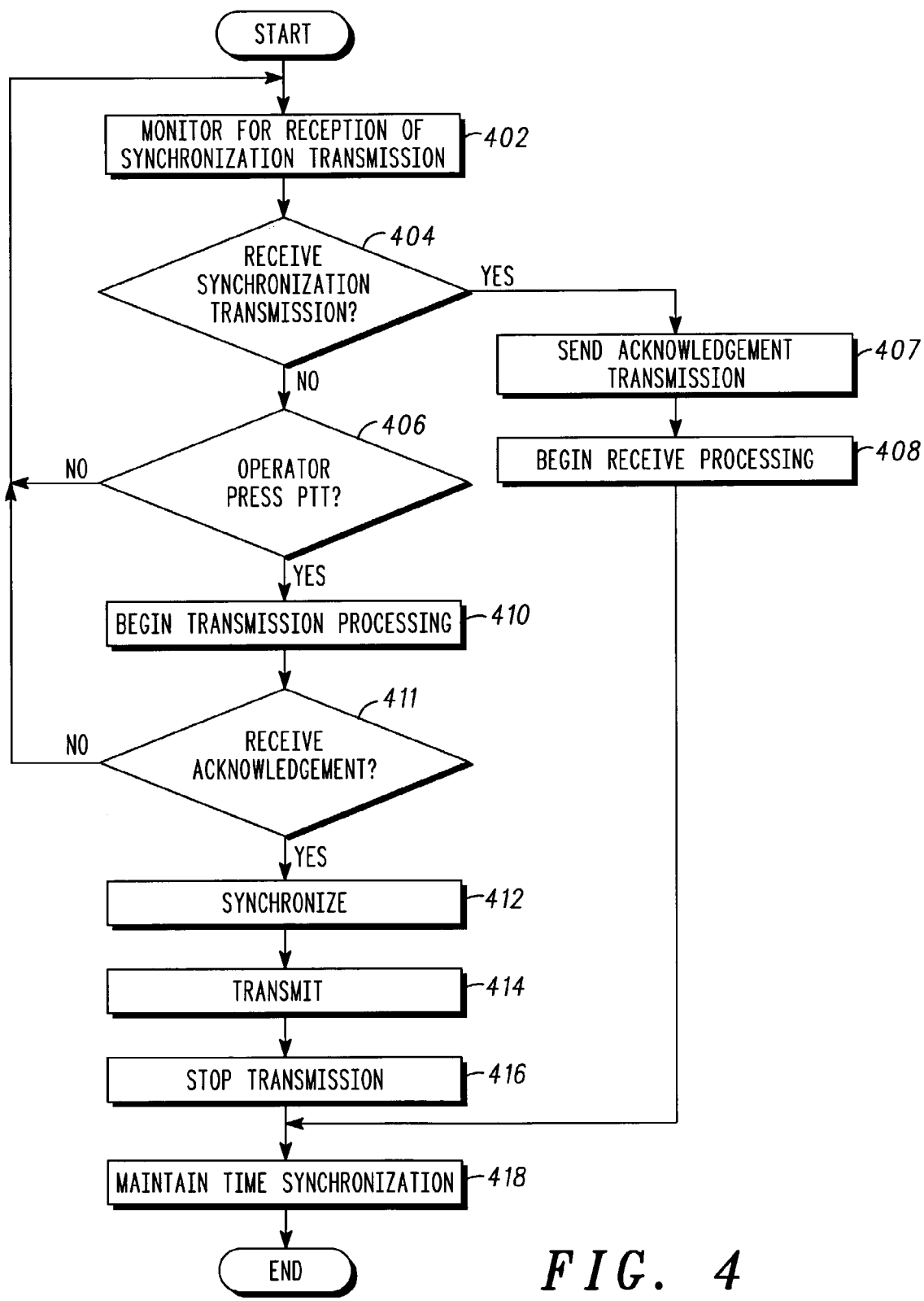
FIG. 4 is an exemplary processing flow diagram for a first communications link as is performed by an exemplary embodiment of the present invention.

An exemplary processing flow diagram 400 for establishing a first communications link as is performed by an exemplary embodiment of the present invention is illustrated in FIG. 4. The processing in this exemplary RF communications flow beings by monitoring, at step 402, for reception of a synchronization signal that is transmitted by another wireless transceiver. This monitoring is performed in the exemplary embodiment by monitoring the three "synchronization" RF frequencies on which a transmitter will transmit a synchronization signal. If a signal is received on one of these frequencies, the processing continues by determining, at step 404, if the remainder of the synchronization transmission that is transmitted by the transmitter is beginning a transmission. The exemplary embodiment transmits a synchronization transmission that includes a preamble pattern and a symbol synchronization patterns. The preamble pattern identifies the transmission as a synchronization signal and the symbol and frame synchronization pattern is used to facilitate transmitted data symbol and frame clock synchronization. If the synchronization transmission is not successfully received, the processing of the exemplary embodiment continues by determining, at step 406, if the operator has pressed the Push-To-Talk (PTT) button. If the operator has not pressed the PTT button 314, the processing returns to monitoring, at step 402, for a synchronization transmission.

If a synchronization transmission was determined to have been received, the processing continues by sending, at step 407, an acknowledgement transmission. An acknowledgement transmission is transmitted upon receipt of a synchronization transmission to notify the transmitter that a receiver is available. The processing then begins the processing, at step 408, that is performed to receive a transmission. The receive processing of the exemplary embodiment includes tracking, by conventional means, the FH-SS signal being received. When the transmitter is ending its transmission, it transmits a stop pattern and ceases transmission. After the transmitter has ceased transmitting a signal, the receive processing within this wireless transceiver 102 ceases and the processing of the exemplary embodiment continues by maintaining, at step 418, synchronization to the time frame of the previously transmitted signal. The exemplary embodiment maintains synchronization through the use of an internal clock within the wireless transceiver. The exemplary embodiment maintains time synchronization for six seconds after the transmission of the FH-SS signal ceases in order to facilitate the same or the other wireless transceiver beginning transmission.

If it was determined that the operator had pressed the PTT button 314 of the wireless transceiver 102, the processing continues by beginning, at step 410, transmission processing. The transmission processing of the exemplary embodiment follows conventional FH-SS transmission processing techniques. Initial transmission processing includes determining the current FH-SS "channel" on which to transmit and to perform initialization of the RF transmission circuits 206. After starting the transmission sequence, the wireless transceiver 102 of the exemplary embodiment monitors, at step 411, for a reception of an acknowledgement signal from a remote receiver. If an acknowledgement signal is not received, processing returns to monitoring, at step 402, for reception of a synchronization transmission. If an acknowledgement signal is received, the processing continues by synchronizing, at step 412. Transmission synchronization is accomplished with a synchronization transmission that is similar to that described above. After synchronizing, the processing continues by transmitting, at step 414, user voice or data over user traffic channels via the FH-SS transmission. The processing stops, at step 416, the RF transmission when user voice or data transmission is complete, as is signaled by release of the PTT button 314 in the exemplary embodiment. The wireless transceivers of the exemplary embodiment transmit an End-Of-Transmission indication when the user releases the PTT button 314 and transmission is about to stop. After signal transmission by the wireless transceiver 102 ceases, or reception of a remotely transmitted RF signal ceases, the processing maintains, at step 418, time synchronization with the FH-SS time frame of the previously received or transmitted FH-SS signal. The exemplary embodiments of the present invention maintain this synchronization through the use of an internal clock 312. The exemplary embodiments of the present invention tune the RF receive circuit 308 to the frequency specified by the FH-SS time frame and monitor for reception of a data signal that indicates a request to resume communications with a second communications link.

Figure 5:
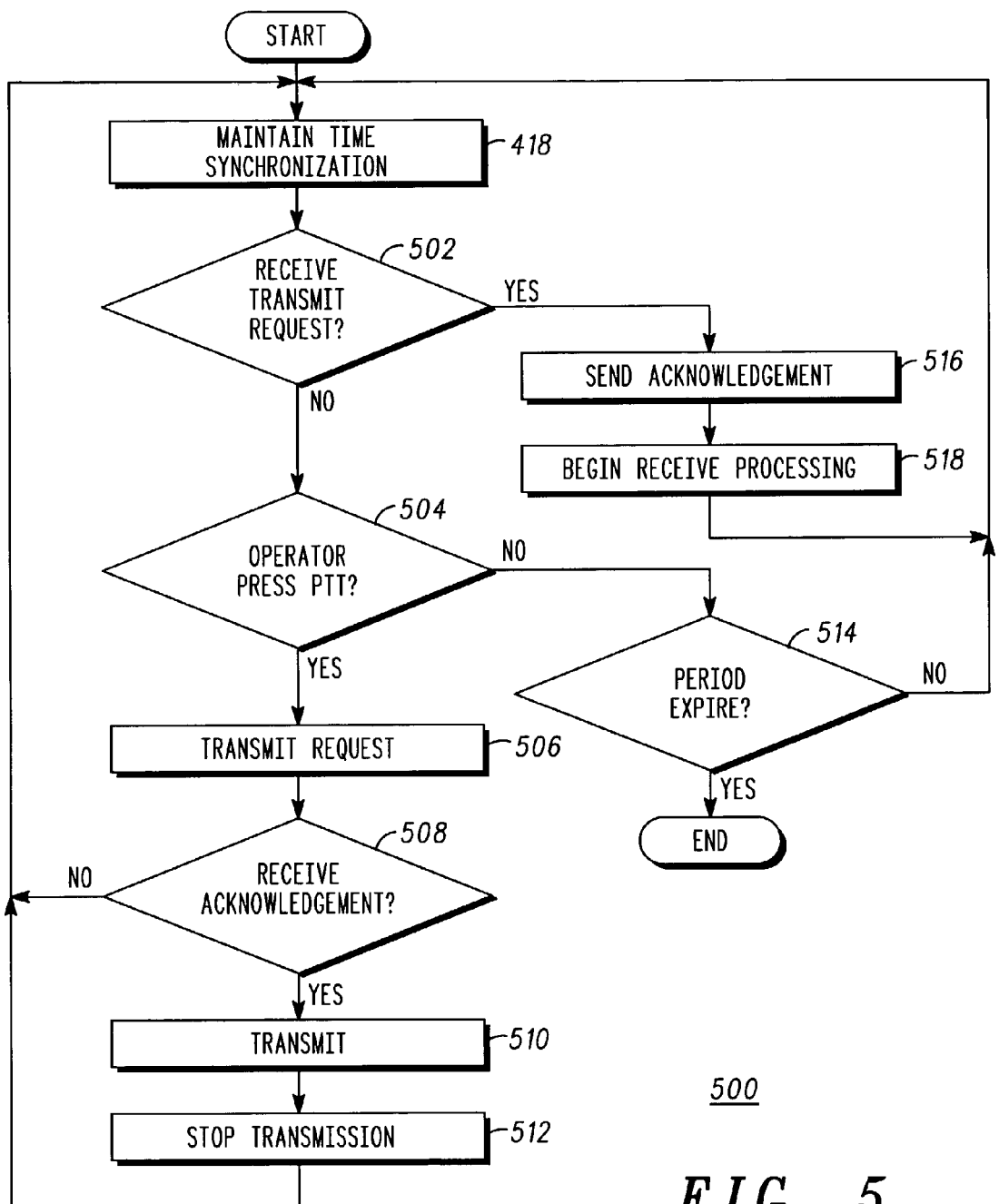
FIG. 5 is an exemplary processing flow diagram for a second communications link as is performed by an exemplary embodiment of the present invention.

An exemplary processing flow diagram 500 for establishing a second communications link as is performed by an exemplary embodiment of the present invention is illustrated in FIG. 5. The wireless transceiver 102 of the exemplary embodiment of the present establishment remains prepared to establish a second communications link after completing the operating the operation of the first communications link by maintaining, at step 418, time synchronization to the time frame of the first communications link, as is described above. The processing of the exemplary embodiment next determines, at step 502, if a transmit request has been received. In the exemplary embodiment, the wireless transceiver that had been transmitting and any wireless transceivers that were receiving that transmission maintain time synchronization to the FH-SS time frame of that terminated transmission. If a transmit request was received, the processing continues by sending, at step 516, an acknowledgment signal. The acknowledgment signal in the exemplary embodiment is a data packet with a pre-defined content that acknowledges the transmit request and signals that the wireless transceiver will begin to process data reception.

The wireless transceivers incorporating the exemplary embodiment of the present invention operate their receiver circuits 308, so as to receive any transmission that is communicated at the RF frequency specified by the FH-SS time frame of the previously ceased transmission. Any wireless transceiver that has maintained synchronization to the time frame of the previously ceased transmission is then able to transmit at the frequency specified by that FH-SS time frame and other wireless transceivers that are maintaining time synchronization with the FH-SS time frame and are tuning their receivers to the corresponding frequency sequence will receive that transmission. These transmissions are able to be either the transmission request or the acknowledgement message. The exemplary embodiments of the present invention transmit a unique data message at the RF frequency specified by the RF frequency hopping sequence in order to indicate a transmission request, which is a request to start a communications session.

If a transmit request is not determined to have been received, the processing continues by determining, at step 504, if the user of the wireless transceiver has pressed the PTT button 314 to indicate a start of transmission. If the user has pressed the PTT button 314, the processing sends, at step 506, a transmit request message as is described above. The processing then determines, at step 508, if an acknowledgement is received from the remote transceiver. If an acknowledgement is received, the processing continues by transmitting, at step 510, data to be communicated. The wireless transceiver 102 of the exemplary embodiment ceases, at step 512, transmission as is described above. If an acknowledgement is not received or after the transmission has ceased, the processing continues by maintaining time synchronization, at step 418.

If it was determined that the user did not press the PTT button 314, the processing then determines, at step 514, if the extended synchronization period has expired. The extended synchronization period in the exemplary embodiments is a predetermined time duration that extends past the time that the transmitter ceases transmission. The extended synchronization period is a time period that occurs after the transmission of the FH-SS signal has ceased and during which transceivers of the exemplary embodiment of the present invention maintain synchronization to the FH-SS time frame. The exemplary embodiment utilizes an extended synchronization period of six seconds to allow for conventional walkie-talkie half-duplex communications. If the extended synchronization period was determined to have expired, processing then stops. If the extended synchronization period has not expired, the processing returns to maintaining, at step 418, time synchronization.

In the above described processing, there is a possibility that two or more wireless transceivers send a transmit request during the time that the wireless transceivers maintain time synchronization with a previously transmitted signal. Embodiments of the present invention utilize a time slot assignment mechanism wherein each wireless transceiver is assigned to a subset of time slots within the frequency hopping sequence. An example of such an assignment mechanism is a system that uses two wireless transceivers and that consecutively numbers each FH-SS sequence time slot after the end of the synchronization sequence. In this example, the initial transmitter is assigned to a first subset of timeslots that are the even numbered time slots in the time frame. The initial receiver is similarly assigned to a subset of time slots that are the odd number time slots in the time frame. This introduces a maximum start of transmission delay of one time slot but obviates a need to resolve collisions between simultaneously transmitted transmission requests.

The above description of the exemplary embodiment focused on voice communications for ease of understanding. The exemplary embodiment of the present invention that is described above is also able to communicate data between and/or among wireless transceivers. These embodiments use data communications techniques that are commonly used with FH-SS systems to communicate data. The embodiments utilize the structures and processing that are described above to facilitate rapid switching between transmitting and receiving roles of the wireless transceivers over the course of data communications.

The exemplary embodiments of the present invention advantageously allow frequency hopped spread spectrum devices to communicate with half-duplex communication that does not require re-synchronization after wireless transceivers change transmitter and receiver rolls. The transmission request signal of the exemplary embodiment of the present invention is transmitted in the time duration of one frequency hop. In contrast, the synchronization transmission of the exemplary embodiment consumes twelve transmission time slots or periods of time that the transmitter transmits at the same frequency hop sequence. The exemplary embodiment uses a time duration for each transmitted frequency of ninety (90) microseconds and a synchronization transmission that uses twelve such time durations therefore lasts one thousand and eighty (1080) microseconds. Using the more rapid transmission request signal of the exemplary embodiment of the present invention allows for more natural communications between two or more users since a user is able to begin speaking more rapidly after pressing the PTT button 314 than if a full FH-SS synchronization process was required for each start of transmission. The exemplary embodiments of the present invention also allow operation of the wireless transceivers in the absence of a central controller, such as a base station transmitter. These embodiments use the initial transmitter to set the FH-SS time frame to be used for the half duplex communications performed by both wireless transceivers.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A method for communicating with a transceiver, the method comprising:

establishing a first frequency hopped communications link between a wireless transceiver and a remote transceiver, one of which being an initiator of the first frequency hopped communications link, wherein the first frequency hopped communications link is synchronized to a time frame set by the initiator;

maintaining time synchronization to the time frame set by the initiator after transmission of the first frequency hopped communications link ceases; and establishing a second frequency hopped communications link between the wireless transceiver and the remote transceiver, wherein the second frequency hopped communications link is synchronized to the time frame set by the initiator;

wherein establishing a second frequency hopped communications link comprises a transmission of a transmission request and a reception of an acknowledgement to the transmission request.

2. The method according to claim 1, wherein the second frequency hopped communications link comprises the first frequency hopped communications link.

3. The method according to claim 1, wherein the maintaining is performed in the absence of a base station transmission.

4. The method according to claim 1, wherein the maintaining is performed for a predetermined time period.

5. The method according to claim 1, wherein the establishing a second frequency hopped communications link comprises the wireless transceiver transmitting a transmit request on a first subset of frequency hops within the time frame.

6. The method according to claim 5, wherein the first subset of frequency hops comprise one of even numbered frequency hops within the time frame and odd numbered frequency hops within the time frame.

7. A wireless transceiver comprising:

a transmitter circuit for establishing a first frequency hopped communications link with a remote transceiver, one of the wireless transceiver and the remote transceiver being an initiator of the first frequency hopped communications link, wherein the first frequency hopped communications link is synchronized to a time frame set by the initiator; and a controller for:

maintaining time synchronization to the time frame set by the initiator after transmission of the first frequency hopped communications link ceases; and establishing a second frequency hopped communications link between the wireless transceiver and the remote transceiver, wherein one of the wireless transceiver and the remote transceiver is transmitting over the second frequency hopped communications link and wherein the second frequency hopped communications link is synchronized to the time frame set by the initiator;

wherein the controller establishes the second frequency hopped communications link by a transmission of a transmission request and in response to a reception of an acknowledgement to the transmission request.

8. The wireless transceiver according to claim 7, wherein the second frequency hopped communications link comprises the first frequency hopped communications link.

9. The wireless transceiver according to claim 7, wherein the controller maintains time synchronization in the absence of a base station transmission.

10. The wireless transceiver according to claim 7, wherein the controller maintains time synchronization to the time frame for a predetermined time period after transmission of the first frequency hopped communications link ceases.

11. The wireless transceiver according to claim 7, wherein the controller establishes the second frequency hopped communications link by controlling the transmitter circuit to transmit a transmit request on a subset of frequency hops within the time frame.

12. The wireless transceiver according to claim 11, wherein the subset of frequency hops comprise one of even numbered frequency hops within the time frame and odd numbered frequency hops within the time frame.

13. A method for communicating between transceivers, the method comprising:
 establishing a first frequency hopped communications link between a first transceiver and a second transceiver, wherein the first frequency hopped communications link is synchronized to a time frame and wherein the first transceiver is transmitting over the first frequency hopped communications link and the first transceiver sets the time frame;
 maintaining time synchronization to the time frame at the first transceiver and the second transceiver after transmission of the first frequency hopped communications link ceases; and
 establishing a second frequency hopped communications link between the first transceiver and the second transceiver, wherein one of the first transceiver and the second transceiver is transmitting over the second frequency hopped communications link and wherein the second frequency hopped communications link is synchronized to the time frame initially set by the first transceiver;
 wherein establishing a second frequency hopped communications link comprises a transmission of a transmission request and a reception of an acknowledgement to the transmission request.

14. A computer program product comprising computer programming instructions for:
 establishing a first frequency hopped communications link between a wireless transceiver and a remote transceiver, one of which being an initiator of the first frequency hopped communications link, wherein the first frequency hopped communications link is synchronized to a time frame set by the initiator;
 maintaining time synchronization to the time frame set by the initiator after transmission of the first frequency hopped communications link ceases; and
 establishing a second frequency hopped communications link between the wireless transceiver and the remote transceiver, wherein one of the wireless transceiver and the remote transceiver is transmitting over the second frequency hopped communications link and wherein the second frequency hopped communications link is synchronized to the time frame set by the initiator;
 wherein the computer programming instructions for establishing a second frequency hopped communications link comprise computer instructions for transmission of a transmission request and reception of an acknowledgement thereto.

15. The computer program product according to claim 14, wherein the computer programming instructions for maintaining are performed in the absence of a base station transmission.

16. The computer program product according to claim 14, wherein the computer programming instructions for maintaining are performed for a predetermined time period.

17. The computer program product according to claim 14, wherein the computer programming instructions for establishing a second frequency hopped communications link comprise computer programming instructions for transmitting a transmit request by the wireless transceiver on a first subset of frequency hops within the time frame.

* * * * *